United States Patent [19]

Randall

[11] Patent Number: 5,438,662
[45] Date of Patent: Aug. 1, 1995

[54] ELECTRONIC DISPLAY AND DATA PROCESSING APPARATUS FOR DISPLAYING TEXT AND GRAPHICS IN A RING BINDER REPRESENTATION

[75] Inventor: Stephen Randall, London, United Kingdom

[73] Assignee: Eden Group Limited, Rainow, United Kingdom

[21] Appl. No.: 328,538

[22] Filed: Oct. 25, 1994

Related U.S. Application Data

[63] Continuation of Ser. No. 791,100, Nov. 12, 1991, abandoned.

[30] Foreign Application Priority Data

Nov. 12, 1990 [GB] United Kingdom ............. 9024526

[51] Int. Cl.6 ............................................. G06F 3/00
[52] U.S. Cl. ................................. 395/161; 395/159
[58] Field of Search ............... 345/901, 118-120, 345/122, 125, 129, 131; 395/155-161, 139; 364/927.02; 434/317

[56] References Cited

U.S. PATENT DOCUMENTS

| | | | |
|---|---|---|---|
| 4,159,417 | 6/1979 | Rubincam | 340/706 X |
| 4,649,499 | 3/1987 | Sutton et al. | 395/161 X |
| 4,855,725 | 8/1989 | Fernandez | 340/706 |
| 4,873,625 | 10/1989 | Lane et al. | 340/706 X |
| 4,912,640 | 3/1990 | Tsugei | 364/705.06 |
| 4,997,374 | 3/1991 | Simone | 434/317 |
| 5,001,697 | 3/1991 | Torres | 395/157 |
| 5,021,989 | 6/1991 | Fujisawa et al. | 364/927.2 |
| 5,049,862 | 9/1991 | Dao et al. | 340/706 |
| 5,060,135 | 10/1991 | Levine et al. | 395/159 X |
| 5,072,412 | 12/1991 | Henderson, Jr. et al. | 395/159 |
| 5,140,678 | 8/1992 | Torres | 395/159 |
| 5,167,508 | 12/1992 | McTaggart | 434/317 |
| 5,237,451 | 8/1993 | Randall | 395/157 |
| 5,283,864 | 1/1994 | Knowlton | 395/158 |

OTHER PUBLICATIONS

HyperCard User's Guide, Apple Corp., 1988, pp. 1-161, 185-195.

*Primary Examiner*—Mark R. Powell
*Assistant Examiner*—John E. Breene
*Attorney, Agent, or Firm*—Knobbe, Martens, Olson & Bear

[57] ABSTRACT

One of the problems facing the designers of an electronic display and data processing apparatus is how to allow the user to perform various page management functions to, e.g. text or graphic documents, residing in the system. Examples of such functions are deleting a page or retrieving it from storage or moving it from one location to another or storing it for easy later retrieval. A particularly user friendly arrangement of an electronic display and a data processing apparatus includes a computer for storing data, and a display operable to be controlled by the computer to display a representation of a ring binder including at least one ring whereby when the user selects the ring of the ring binder the ring opens or closes.

17 Claims, 3 Drawing Sheets

ELECTRONIC DISPLAY AND DATA PROCESSING APPARATUS FOR DISPLAYING TEXT AND GRAPHICS IN A RING BINDER REPRESENTATION

This application is a continuation of application Ser. No. 07/791,100, filed Nov. 12, 1991, now abandoned.

FIELD OF THE INVENTION

This invention relates to an electronic display and data processing apparatus, and in particular to such an apparatus which is especially user friendly in the way it allows various page management tasks to be accomplished.

DESCRIPTION OF THE PRIOR ART

The term electronic display and data processing apparatus includes within its scope electronic notebooks and computers with a display. One of the problems facing the designers of such equipment and their operating environments is how to allow the user to perform various page management functions to data, e.g., text or graphic documents, residing in the system. Examples of such functions are deleting a page or retrieving it from storage or moving it from one location to another or storing it for easy later retrieval. A further example is grouping together a number of related pages so that any of the above functions can be performed on the group of pages as a whole.

Because these functions have to be mastered early on for most users, it is particularly important to make these functions easily performable, i.e., to make this aspect of the system as user friendly as possible.

Prior art approaches to user friendly page management are best exemplified by the Apple ® interface for personal computers. This is a direct-manipulation interface designed to allow users to feel as if they are directly manipulating the objects in the system (for instance, a piece of paper on which text appears for a word processing application) rather than verbally instructing an intermediary to perform those functions. In this system, after a document is created, it must be given a unique name by the user. This is done by the user typing in his preferred choice using an alphanumeric keyboard. Once the document is no longer to be addressed, the user can then close the document down by selecting a "Close" option from a pull-down menu. After this is done, a graphics icon representing the document appears on the screen. Because the document icon is readily recognizable and occupies little space on screen, it can be a convenient way of representing the location of stored information to the user. The document icon can be dragged into a folder icon. The folder icon can contain a large number of documents, just as a real folder. It therefore provides a convenient way of storing a large number of documents. Since a number of different folders can be created, and each can be given a different name by the user, this overall approach provides a relatively user friendly solution to the problem of page storage. To retrieve the document from any closed folder, the user has first to select the folder containing the document by moving the cursor to the folder and then clicking on the mouse button. This opens the folder and reveals the document icons that have already been placed into that folder. The user then has to select the document icon representing the document he wants to open, again by moving the cursor to that document icon and then clicking on the mouse button. The user then has to select the "Open" option from a pull-down menu by moving the cursor to the pull-down menu header (in this case marked "File"), selecting that header to reveal the related options, and then moving the cursor to the "Open" option and finally clicking on that option. When this is done, the document itself will finally appear on screen.

Moving a document from, say one folder to another, is also relatively straightforward in that the user has to drag the document icon from the original destination, i.e., opened folder, to the final folder. Dragging is done by moving the cursor to the document icon, clicking on the mouse and moving the cursor point to the destination point while keeping the mouse button depressed. Releasing the button when the destination folder is selected places the document into that folder.

Deleting a document is achieved by selecting the document in the above-described manner and dragging it to an icon of a waste bin. When the mouse button is released with the waste bin selected, the document is dumped into that bin.

Grouping together a number of separate pages so that a single document is formed can be achieved by copying the second page of the number onto the clipboard (a temporary memory store) and then pasting the page from the clipboard onto the end of the first page of the number. This procedure would be repeated for each subsequent page until a single document was created.

Further reference may be made to the Apple Hypercard ® approach which allows the user to create documents that emulate cards in a rotating card stack. As an illustration of the document management approach in this prior art, four steps need to be performed by the user should he want to change the position of a card within the stack. These steps are:

(1) to move to the card to be moved by selecting a "Forward" button;
(2) to activate a specific drop-down menu and then choose the "Cut Card" option presented by that drop-down menu;
(3) to sequence through the cards until the card that is to precede the card to be moved is reached; and
(4) to activate the same drop-down menu and then choose the "Paste Card" option from that menu.

It will be appreciated by those skilled in the art that the graphical icon approach exemplified by the Apple interface and the Hypercard product are for computer novices considerably easier to use than, for example, a text controlled MS-DOS system. Nevertheless, they do present some techniques that have to be understood by the novice, for instance the ideas of drop-down menus and controlling a mouse, and these may constitute barriers to some potential users. In many products which are or incorporate electronic display apparatus, the presence of any such barriers is a major drawback. This will particularly be the case with products that aim to be electronic notebooks, for example, since such products have to appeal to users who are not computer literate.

Further reference may be made to U.S. Pat. No. 5,237,651 (Randall) which discloses an electronic personal organizer for a keyboardless computer (also known as a pen computer) which utilizes the metaphor of a personal organizer as its basic screen display. This specification does not, however, touch on the page management functions that are the subject of the present invention.

OBJECT OF THE INVENTION

It is an object of the present invention to provide an electronic display and data processing apparatus that provides for page management functions in a more user friendly manner than the prior art. In particular, it is an object to provide an electronic display and data processing apparatus that utilizes visual indications to enable the user to readily appreciate the status of the apparatus and readily comprehend how to operate the apparatus.

STATEMENT OF THE INVENTION

In accordance with the present invention, an electronic display and data processing apparatus comprises:
computing means for storing data; and
display operable to be controlled by the computing means to display a representation of a ring binder including at least one ring whereby when the user selects the ring of the ring binder, the ring opens or closes.

The present invention is predicated on the insight that a ring binder is a widely recognizable form of page storage and that the appearance of the ring of the binder opening or closing when selected gives a clear message to the user that the representation is mimicking a "real world" ring binder. The opening ring binder metaphor is therefore an approach to informing the user about the status of the system and, in particular, the readiness to allow a page management function to be performed. It provides the crucial user friendly first step in the dialogue between the user and the apparatus, and leads to the user operating any embodiment of the invention with a very short learning curve.

For the avoidance of doubt, the word "ring" refers to the member which retains paper with holes punched in its margins and includes within its scope both the singular and plural, as does the word "rings." It does not have to be formed as a circularly curved member. It will be appreciated that the term "selects" used herein is a term widely recognized in this art and that selection can be achieved in a variety of ways. For instance, where the apparatus includes a mouse or some other pointing device, selection is achieved by moving the cursor to a ring and then clicking on the mouse button. Where the apparatus incorporates touch screen technology, for example a digitizing network laid adjacent and across the display screen, then the user merely has to touch a ring with the appropriate stylus. It will be appreciated also that such touch screen technology may be particularly appropriate for some sorts of products where user friendliness is paramount, although it is not an essential ingredient for all aspects of the present invention.

Conveniently, when the display is operable to be controlled by the computing means to display a representation of pages filed in the ring binder, then the foremost page is also selected when the user selects one of the rings and that selected page is shown in a reduced size compared to the non-selected pages. This clearly indicates to the user that a page management function can be performed on the selected page. It also means that the page behind the selected page can be viewed more clearly than before, which is especially useful if the pages behind the selected page are going to be scrolled through to find a new location at which to file the selected page.

Preferably, the display is further controlled by the computing means on a pop-up menu after the user has selected the rings, the menu proposing a page management action or actions. By automatically displaying possible next steps, the user is freed from the choice of having to remember which pull-down menu to select, and the need to choose the right option in the menu. In the present invention, the user merely has to select the desired option button. Because the choice is limited, it is easily made. The act of selecting will generally be done by clicking or touching the button displayed, depending on the hardware used, e.g., mouse or touch screen. Embodiments of the invention which require a mouse, or other pointing device such as a trackball, are still easier to operate than the prior art devices because the cursor movements required are simpler in the present invention, requiring no more than clicking on a single button.

Usually, two option buttons will be displayed, each suggesting one of the page management actions of (1) inserting a page into the ring binder or (2) deleting a page from the ring binder. These are the most useful page management functions to offer. These buttons will hereinafter be referred to, respectively, as "Insert" and "Delete" buttons. For the avoidance of doubt, the actual wording used in any embodiment of the invention need only convey a similar meaning to the above terms to come within the ambit of the above definitions of the option buttons. Alternatively, only the "Insert" button may be displayed, with the delete function being achieved by dragging the page to be deleted off the display screen.

Conveniently, the representation of a ring binder contains at least one underlying page overlaid by a top page and at least one edge of a said underlying page is visible adjacent to an edge of the top page. This contributes to the adequacy of the representation. Similarly, the representation of a ring binder may contain at least one tabbed index page overlaid by a top page, the tab of the tabbed index page being visible adjacent to an edge of the top page.

Once the user has grasped the ring binder metaphor that the invention presents to him, it is necessary for the apparatus to continue in a consistent and user friendly manner.

Where the page management action is deleting a page that is bound in the ring binder, selecting the page to be deleted may result in the display being controlled by the computing means to display the page at a reduced size and in a position in which it is no longer bound by the rings of the ring binder and may cause a "Delete" button on a pop-up menu to be displayed which, if selected, results in the display being controlled by the computing means to omit the selected document from the display and to display the ring binder with rings closed.

Further, while the page management action is moving a page, selecting the page to be moved may result in the display being controlled by the computing means to display that page at a reduced size and in a position in which it is no longer bound by the rings of the ring binder. An "Insert" button on a pop-up menu is displayed on each page that the user scrolls to. When the user reaches the required destination, he then presses the "Insert" button on the pop-up menu. This results in the display then being controlled by the computing means to display the said page at the required destination bound by the rings of the ring binder.

Further, where the page management action is grouping together as a single document a number of pages from a set of pages, the user may be able to select a page grouping tool that once selected appears on all pages within the set of pages as a user selectable option button or icon. The user then scrolls through the set of pages, selecting the option button or icon on each page that he wishes to form part of the single document. This is a particularly intuitive solution to the problem of grouping pages together.

Conveniently, the page grouping tool may comprise a representation of at least part of a paper clip. All pages of a document that have been grouped together using the paper clip tool will preferably include a depiction of a part of a paper clip at one corner.

The page management functions described above may be performed on pages grouped to form a document. For instance, if the user wants to move or delete a page from within such a document, he may with the binder open at that page either select the rings or the page grouping tool, e.g., the paper clip. When he does this, the rings of the binder open and the page shrinks. Pop-up menus asking "Delete this page from this document?" and "Insert" and "Delete" buttons appear. The remainder of the procedure is as outlined above. The user is therefore constrained to unclip a page from its document if he wants to move it. If the user selects the front page of a document, then the next event is the appearance of a pop-up menu asking "Move the entire document or just the front page?" with appropriate response options This provides for the two possible alternatives that the user might intend by touching the front page.

In a preferred embodiment, an electronic display and data processing apparatus comprises a data input means overlaying, underlying or integral with the visual display means and cooperating with a manually movable stylus member whereby the stylus is operable to allow graphical data input by a user.

BRIEF DESCRIPTION OF THE DRAWINGS

The invention will be further described with reference to the accompanying drawings which depict an electronic display and data processing apparatus in accordance with the present invention, and more particularly which show.

DETAILED DESCRIPTION

Figure 1:
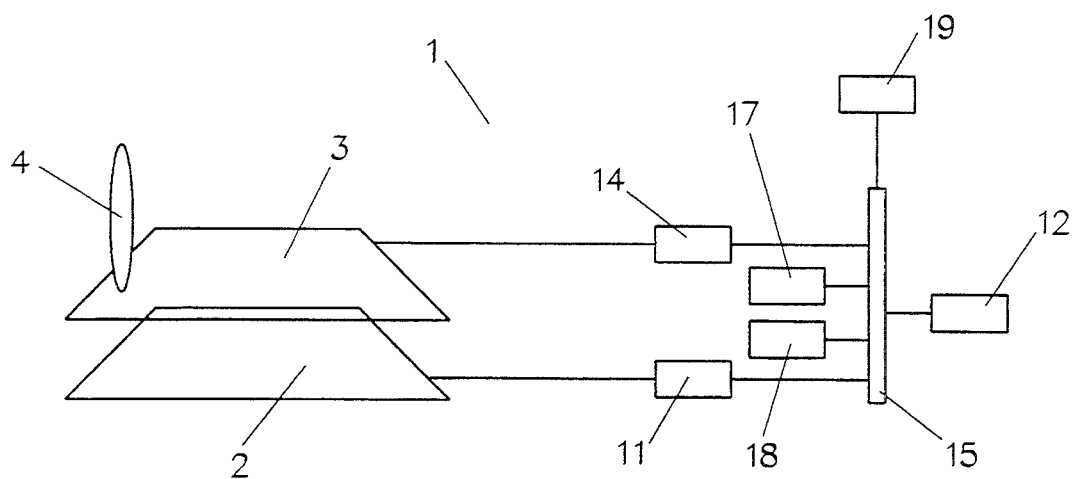
in FIG. 1, a schematic view of the main components of an electronic display and data processing apparatus in accordance with the present invention.

Referring now to FIG. 1, a display means, preferably comprising a LCD-type display 3, is shown forming part of an electronic display and data processing apparatus 1. The input arrangement for this type of keyboardless computer or pen computer is well known in this art and will only be briefly described here. Computer 1 therefore comprises an electromagnetic induction digitizing mat or tablet 2 underlying the display 3, together with an electromagnetic stylus 4. The digitizing mat 2 comprises an electrically conducting grid with conductors running parallel to an X-axis, overlaying a similar grid with conductors running parallel to a Y-axis. The stylus 4 comprises an energizable coil a (not shown) which can be excited with alternating current. The amplitude of the voltages induced in the conductive grids provide an indication of the position of the stylus 4 relative to the Cartesian co-ordinate system defined by the X and Y axes. The detailed operation of this form of digitizer is well known in the field. Further reference may be made, for example, to U.S. Pat. No. 4,570,033. Using this digitizing system, the user can easily and naturally input graphical information for storage and virtually simultaneous display on the display 3.

It will be appreciated that a variety of components, e.g. a power supply, is necessary for the functioning of the apparatus and will have to be present in the apparatus but these are not expressly detailed here in the interests of brevity and clarity. Whilst the transducer pad 2 is shown schematically underlying the LCD type display 3, it may in practice be embedded within it or positioned above it.

Returning to FIG. 1, the stylus 4 is touching the display 3 and electrical signals indicative of the position (X Y Co-ordinates) at which it contacts the display 3 are supplied to an analog-to-digital converter 11 feeding a data path or system bus 15. A CPU 12 is connected for bidirectional data flow to the bus 15, as is a RAM 17. A ROM 18 is also connected to bus 15, being programmed with the operating system for the apparatus, including the telecommunications procedures and the word processing and graphics software which allows users to input, amend and edit textual or graphic information on screen using the stylus. By way of example, the stylus can be used as an electronic pen to input handwritten graphics and can be used in an eraser mode whereby as it is moved over displayed text that text is deleted from display.

The CPU 12 provides all control signals via bus 15 and further includes an internal clock which allows all inputs to the device to be flagged with a time signal indicating when that input was made. The RAM17 stores the user input, i.e., all original input plus any annotations or amendments the device user might wish to make to that input. A display driver 14 is connected to bus 15 and drives the display 3. A communications port 19 is shown connected to the bus 15 and allows the present apparatus to be networked to other electronic devices, e.g. other apparatus like the present invention.

Figure 2:
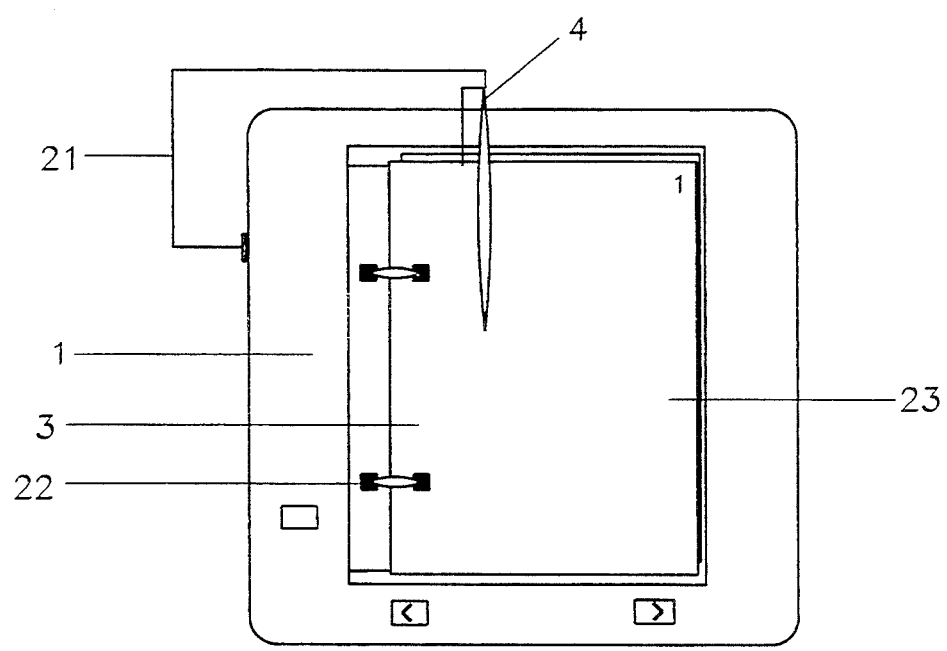
in FIG. 2, an embodiment of the invention displaying a representation of a ring binder with rings closed.

Turning now to FIG. 2, the electronic display and data processing apparatus 1 is shown in plan form. The display 3 is shown shaded and the stylus 4 is shown connected to the control circuitry by cabling 21.

The display 3 shows a representation of a ring binder with rings 22 closed. A page 23, labelled in the representation as page 1 in the top right hand corner, is shown foremost in the ring binder. In use, the user can use the stylus on the display area 3 overlying page 23 just as if the stylus were a pen and the page 23 were paper, i.e., where the user touches the stylus to the screen the underlying pixels of screen 3 are darkened.

Figure 3:
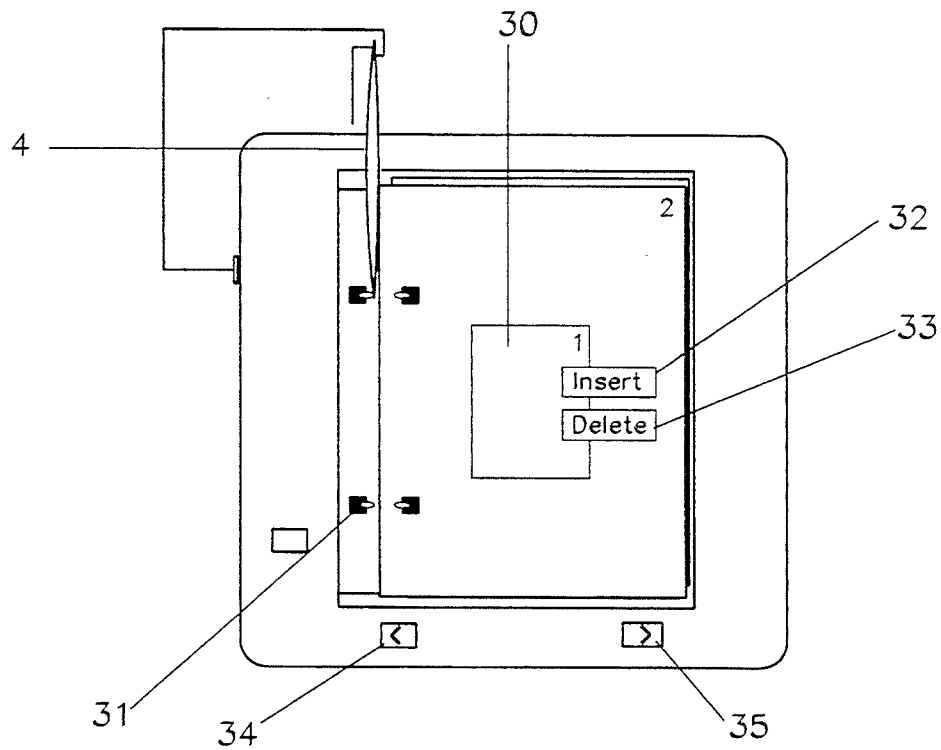
in FIG. 3, an embodiment of the invention displaying a representation of a ring binder with rings selected by the user and shown in an open position and presenting the option button for moving and deleting a page from the ring binder.

Referring to FIG. 3, should the stylus be touched to either of the rings 22 then the rings are shown as opened rings 31. This is a crucial step in portraying to the user how the apparatus is to be used. By having the rings open when they are touched, the metaphor to a real world ring binder that is suggested by the initial display, e.g. as shown in FIG. 2, is further defined. In the real world, when one wants to insert or take out a page from the binder, then one of course has as a first step to open the rings. By mimicking this aspect of what happens in the real world, the present apparatus becomes particularly user friendly. After the rings open, the foremost page in the binder, i.e., that page labelled "1" in the top right hand corner, is shown at 30 in reduced size and approximately centered on the screen. Additionally, an option button displaying the prompt "Insert" is shown at 32 and a further option button displaying the prompt "Delete" is shown at 33. When the user wants to delete the page 30 shown in reduced size, he simply touches the stylus on the screen area overlying the "Delete" button. This causes an appropriate signal to be sent to the CPU 12 which causes the screen to be updated to display the ring binder without the selected page 30. The foremost page then becomes the page indicated by the number "2" at its top right corner.

Figure 4:
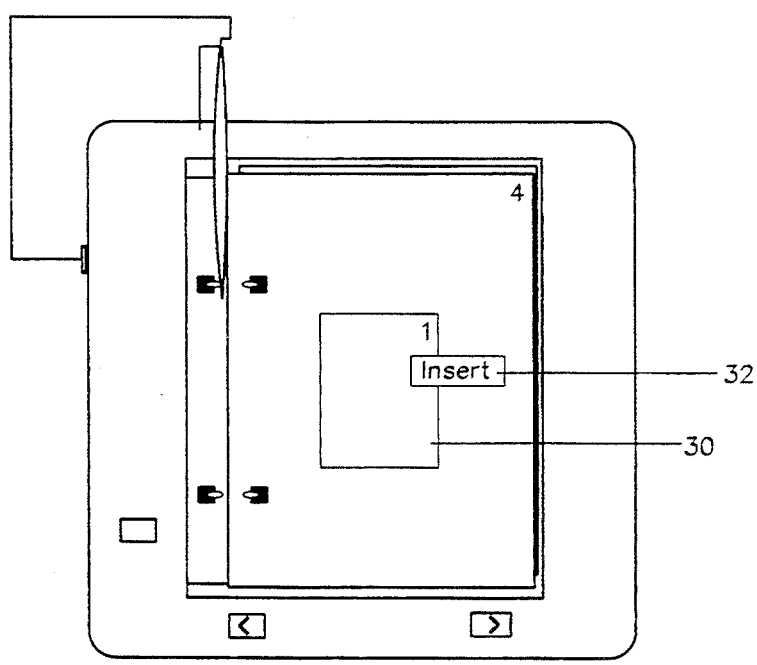
in FIG. 4, an embodiment of the invention displaying a representation of a ring binder during the process of moving either a page from one position in the ring binder to another or deleting a second page from the ring binder.

If the user wants to move the page 30 to another location in the ring binder, he touches the appropriate scroll forward button 35 or scroll backward button 34. These are embodied as soft keys. When he does so, the CPU 12 controls the screen to display a representation of pages turning in the appropriate direction. When the desired location is reached, the user releases the selected scroll button 34 or 35. In FIG. 4, the apparatus is shown displaying the ring binder after the user has scrolled forward two pages. Should the user tough the "Insert" button 32 the selected page 30 will be inserted back into the ring binder at the location preceding the page labelled "4" in its top right hand corner. The pages may then be automatically re-paginated. The ring binder will then be shown with rings closed as at 22 in FIG. 1.

Figure 5:
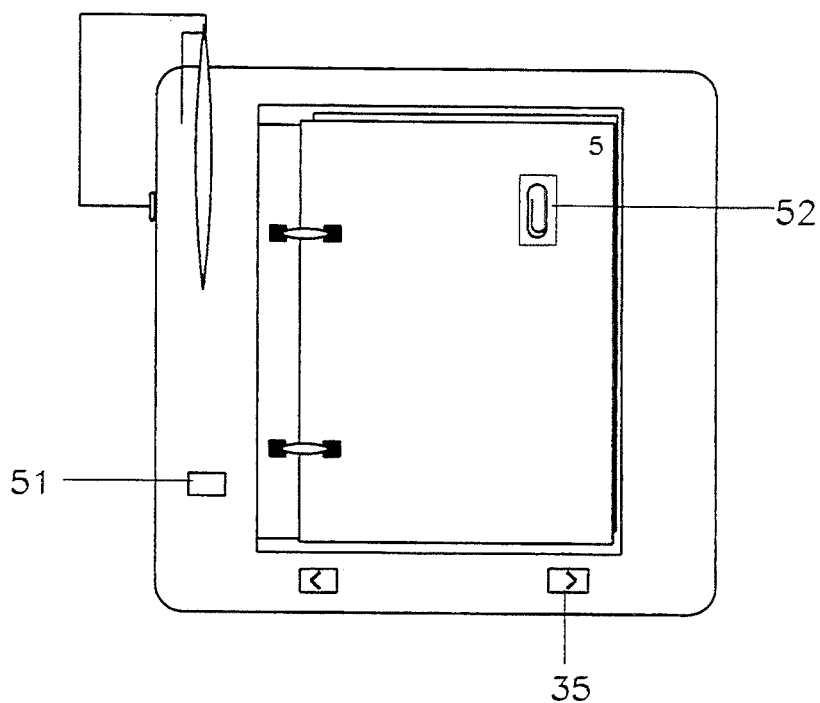
in FIG. 5, an embodiment of the invention displaying a representation of a ring binder at the start of the process of grouping a number of pages to form a document using the paper clip page grouping tool; and in FIG. 6, an embodiment of the invention displaying a representation of a ring binder at the end of the process of grouping a number of pages to form a document using the paper clip page grouping tool.
Figure 6:
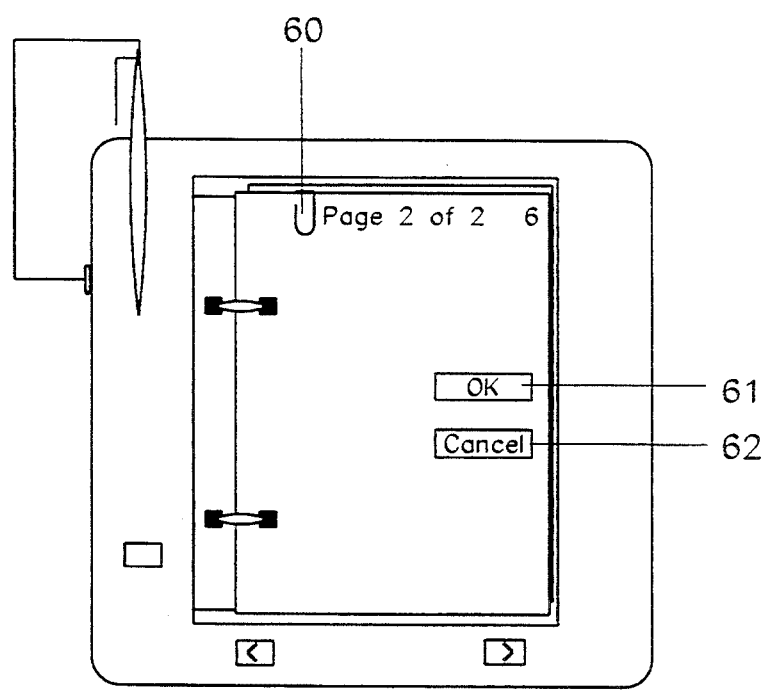

Turning now to FIG. 5, if the user wants to group together a number of pages as a single document, then he uses the paperclip function. Grouping together a number of pages as a single document is often convenient since that document can then be handled as a single entity. This is useful if the user wants, for example, to send the document to further electronic display and data processing apparatus connected to the user's machine via the communications port 19 since he need initiate the sending of only a single document as opposed to a number of separate pages. As a first step to grouping pages, he selects this function by pressing the paperclip soft key 51. This is conveniently marked with an icon of a paperclip (not shown). A button with a paperclip icon then appears on the foremost displayed page. For instance, in FIG. 5 the user has decided to group together pages 5 and 6. After pressing paperclip key 51 he has scrolled forward to page 5 using the scroll forward button 35. On each page that he has passed, there was displayed a paperclip button as in 52. However only when he reaches page 5 does the user touch the paperclip button 52 with stylus 4. He then scrolls forward to the next page and again touches paperclip button 5 with stylus 4. The user then exits the paperclip function by again pressing the paperclip key 51. The screen display is then as shown in FIG. 6. The top right of the final page of the two page document, i.e., page numbered with a "6" in its top right hand corner, has a depiction of one loop of a paperclip 60 at its top left, together with the description "Page 2 of 2," i.e., since page 6 is the second page of a two page document. Similarly, page 5 (not shown) would have at its top left the depiction of the other loop of a paperclip. Two option buttons, an "OK" button 61 and a "Cancel" button 62 are also displayed. If the user touches the "OK" button with stylus 4 then the document is created and stored. Touching the "Cancel" option removes all paperclips from the pages.

The page management functions described above may also be performed on pages grouped to form a document. For instance, if the user wants to move or delete a page from within such a document (not shown), he may with the binder open at that page either select the rings or the page grouping tool, e.g. the paperclip. When he does this, the rings of the binder open and the page shrinks. Pop-up menus asking "Delete this page from this document?" and "Insert" and "Delete" buttons appear. The remainder of the procedure is as outlined above. The user is therefore constrained to unclip a page from its document if he wants to move it.

If the user selects the front page of a document, then the next event is the appearance of a pop-up menu asking "Move the entire document or just the front page?," with appropriate response options. This provides for the two possible alternatives that the user might intend by touching the front page.

What is claimed is:

1. An electronic display and data processing apparatus for displaying a page of text or graphics and adapted to facilitate deleting or moving such a page of text or graphics, comprising:

a computer that stores data and that generates control signals; and a display controlled by the control signals to display a representation of a ring binder, including at least one ring, the ring of the ring binder being selected as a first step in deleting a page or moving a page whereby selecting the ring results in the ring appearing to be open;

wherein the display is operable to be controlled by the control signals to display a representation of a bundle of several pages filed in the ring binder, and wherein a page lying uppermost in the bundle is selected when a user selects the ring and said selected uppermost page is shown in a reduced size compared to non-selected pages;

wherein the display is further controlled by the control signals to display at least one option button after the user has selected the ring, the option button proposing a page management action selected from a group of page management actions comprising:

an action of deleting the page that is bound in the ring binder;

an action of moving the page to a new position in the ring binder;

wherein said action of deleting the page that is bound in the ring binder, further comprises:
an action of selecting the page to be deleted;
an action of displaying the selected page on the display at a reduced size and in a position in which the selected page is no longer bound by the ring of the ring binder;
an action of displaying a "Delete" button on a pop-up menu on the display, said "Delete" button, when selected, omitting the selected page from the display and displaying the ring binder with the rings closed.

2. An electronic display and data processing apparatus as claimed as claimed in claim 1, wherein said action of moving the page to a new position further comprises:
an action of selecting the page to be moved;
an action of displaying said selected page on the display at a reduced size and in a position in which the selected page is no longer bound by the ring of the ring binder; and
an action of displaying an "Insert" button on a pop-up menu on each successive page that is scrolled to, said "Insert" button, when selected, resulting in the display moving said selected page to a position immediately in front of the page on which the selected "Insert" button is displayed.

3. An electronic display and data processing apparatus as claimed in claim 1, wherein the group of page management actions further comprises:
an action of grouping together as a single document a number of pages from a set of pages, whereby the user can select a page grouping tool that, once selected, appears on all pages within the set of pages as a user selectable option button or icon, whereby the user scrolls through the set of pages, selecting the option button or icon on each page that the user wishes to form part of a single document.

4. An electronic display and data processing apparatus as claimed in claim 3, wherein the page grouping tool comprises a representation of at least part of a paperclip.

5. An electronic display and data processing apparatus as claimed in claim 1, where the display is further controlled by the control signals to display a representation of a ring binder containing at least one underlying page overlaid by a top page and at least one edge of said underlying page being visible adjacent to an edge of the top page.

6. An electronic display and data processing apparatus as claimed in claim 1, where the display is further controlled by the control signals to display a representation of a ring binder containing at least one tabbed index page overlaid by a top page, a tab of the tabbed index page being visible adjacent to an edge of the top page.

7. An electronic display and data processing apparatus as claimed in claim 1, further comprising a data input means overlaying, underlying or integral with the electronic display and cooperating with a manually movable stylus member whereby a stylus allows graphical data to be input by the user.

8. An electronic display and data processing apparatus as claimed in claim 1, where the action of deleting a page that is bound in the ring binder, further comprises:
selecting the page to be deleted;
displaying the page at a reduced size on the display and in a position in which it is no longer bound by a ring of the ring binder, such that the page is deleted when the user drags the page off the display.

9. A method of controlling an electronic display and data processing apparatus, adapted to display a page of text or graphics, that facilitates deletion or moving of such a page of text or graphics, comprising the steps of:
storing data in a computer and generating control signals;
using the control signals to control a display to show a representation of a ring binder, including at least one ring, whereby the ring of the ring binder is selected as a first step in deleting a page or moving a page such that selecting the ring results in the ring appearing to open;
displaying a representation of a bundle of several pages filed in the ring binder, wherein the page lying uppermost in the bundle is selected when a user selects the ring and wherein said selected uppermost page is shown in a reduced size compared to non-selected pages;
displaying at least one option button after the user has selected the ring, the option button proposing a page management action selected from a group of page management actions, comprising:
an action of deleting the page that is bound in the ring binder;
an action of moving the page to a new position in the ring binder;
selecting the page to be moved;
displaying the page on the electronic display at a reduced size and in a position in which the selected page is no longer bound by the rings of the ring binder; and
displaying an "Insert" button on the display on a pop-up menu on each successive page that is scrolled to by the user, said "Insert" button, when selected, moving the page on the electronic display to a position immediately in front of the page on which the selected "Insert" button was displayed.

10. The method as claimed in claim 9, additionally comprising the step of displaying a representation on the display of a ring binder containing at least one underlying page overlaid by a top page and at least one edge of said underlying page being visible adjacent to an edge of the top page.

11. The method as claimed in claim 9, additionally comprising the step of displaying a representation on the display of a ring binder containing at least one tabbed index page overlaid by a top page, a tab of the tabbed index page being visible adjacent to an edge of the top page.

12. The method as claimed in claim 9, wherein the action of deleting a page that is bound in the ring binder, further comprises the steps of:
selecting the page to be deleted;
displaying the page on the display at a reduced size and in a position in which the page is no longer bound by a ring of the ring binder; and
displaying a "Delete" button on a pop-up menu on the display, the "Delete" button, when selected, omitting the page from the display and displaying the ring binder with rings closed.

13. The method as claimed in claim 9, wherein said action of deleting a page that is bound in the ring binder, further comprises the steps of:
selecting the page to be deleted;

displaying the page on the display at a reduced size and in a position in which it is no longer bound by a ring of the ring binder; and deleting the page when the user drags the page off the display.

14. The method as claimed in claim 9, wherein the group of page management actions additionally comprises an action of grouping together as a single document a number of pages from a set of pages, whereby the user can select a page grouping tool, said page grouping tool, once selected, appearing on all pages within the set of pages as a user selectable option button or icon, whereby the user scrolls through the set of pages, selecting the option button or icon on each page that the user wishes to form part of a single document.

15. The method as claimed in claim 14, wherein the page grouping tool comprises a representation of at least part of a paper clip.

16. An electronic display and data processing apparatus for displaying a page of text or graphics and adapted to facilitate deleting or moving such a page of text or graphics, comprising:

a computer that stores data and that generates control signals; and a display controlled by the control signals to display a representation of a ring binder, including a least one ring and at least one page, the ring of the ring binder being selectable as a first step in deleting a page or moving a page whereby selecting the ring results in the ring appearing to be open to permit said page to be moved or deleted.

17. A method of controlling an electronic display and data processing apparatus adapted to display a page of text or graphics, said method comprising the steps of:

storing data in a computer and generating control signals;

controlling a display with said control signals to show a representation of a ring binder which includes at least one ring and at least one page, said ring being selectable as a first step in deleting or moving a page such that selecting said ring results in said ring appearing to be open to permit said page to be moved or deleted.

* * * * *